US006667687B1

(12) United States Patent
DeZorzi

(10) Patent No.: US 6,667,687 B1
(45) Date of Patent: *Dec. 23, 2003

(54) TIRE CONDITION SENSOR COMMUNICATION WITH DUTY-CYCLED, AMPLIFIED TIRE-SIDE RECEPTION

(75) Inventor: Timothy DeZorzi, South Lyon, MI (US)

(73) Assignee: TRW Inc., Lyndhurst, OH (US)

( * ) Notice: Subject to any disclaimer, the term of this patent is extended or adjusted under 35 U.S.C. 154(b) by 436 days.

This patent is subject to a terminal disclaimer.

(21) Appl. No.: 09/711,588

(22) Filed: Nov. 14, 2000

(51) Int. Cl.[7] .............................................. B60C 23/00
(52) U.S. Cl. ....................... 340/447; 340/442; 340/445; 73/146.5; 116/34 R
(58) Field of Search ................................. 340/447, 442, 340/445; 73/146.5; 200/61.22; 116/34 R, 34 B

(56) References Cited

U.S. PATENT DOCUMENTS

| | | | |
|---|---|---|---|
| 4,761,644 A | 8/1988 | Kawai et al. .............. 340/5.64 |
| 5,196,845 A | 3/1993 | Myatt .................... 340/870.31 |
| 5,463,374 A | 10/1995 | Mendez et al. ............ 340/442 |
| 5,573,610 A | 11/1996 | Koch et al. .............. 152/152.1 |
| 5,573,611 A | * 11/1996 | Koch et al. .............. 152/152.1 |
| 5,602,524 A | 2/1997 | Mock et al. ................ 340/447 |
| 5,612,671 A | 3/1997 | MenDez et al. ............ 340/447 |
| 5,880,363 A | 3/1999 | Meyer et al. .............. 73/146.5 |
| 5,924,055 A | 7/1999 | Hattori ...................... 702/138 |
| 5,987,980 A | 11/1999 | Mangafas et al. ......... 73/146.8 |
| 6,087,930 A | * 7/2000 | Kulka et al. ................ 340/447 |
| 6,414,592 B1 | 7/2002 | Dixit et al. ................ 340/447 |
| 6,441,728 B1 | * 8/2002 | Dixit et al. ................ 340/447 |
| 6,498,967 B1 | * 12/2002 | Hopkins et al. ............... 701/1 |

FOREIGN PATENT DOCUMENTS

| | | | | |
|---|---|---|---|---|
| EP | 1026015 A2 | 8/2000 | | |
| EP | 1 197 356 A2 | * 4/2002 | ........... | B60C/23/04 |
| EP | 1 205 317 A2 | * 5/2002 | ........... | B60C/23/04 |

OTHER PUBLICATIONS

U.S. Juzswik patent application Ser. No. 09/727,251, filed Nov. 29, 2000 entitled "Vehicle Communication for Tire Sensor Initiation and Vehicle Keyless Entry Via a Shared Resource."
An interest press release from Siemens Automotive dated Jan. 24, 2001.
U.S. Juzswik patent application Ser. No. 09/687,709, filed Oct. 13, 2000, entitled Vehicle–Controlled Tire Condition Sensor Communication Utilizing Fixed Tire Identification.

* cited by examiner

Primary Examiner—Toan Pham
(74) Attorney, Agent, or Firm—Tarolli, Sundheim, Covell & Tummino L.L.P.

(57) ABSTRACT

A tire condition communication system (10) is intended for incorporation into a vehicle (12). A tire condition sensing unit (e.g., 18A) of the system (10) is operable to sense a tire condition and to transmit a signal (e.g., 24A) indicative of the sensed condition. A vehicle-based unit (28) of the system (10) receives the condition indicative signal (e.g., 24A). A communication arrangement (e.g., 42A and 48A) of the system (10) has a first portion (e.g., 40A) associated with the vehicle-based unit (28) and a second portion (e.g., 48A) associated with the tire condition sensing unit (e.g., 18A). The communication arrangement conveys a control signal (e.g., 44A) from the vehicle-based unit (28) to the tire condition sensing unit (e.g., 18A) that causes the tire condition sensing unit to continue operation during conveyance of the control signal.

27 Claims, 3 Drawing Sheets

TIRE CONDITION SENSOR COMMUNICATION WITH DUTY-CYCLED, AMPLIFIED TIRE-SIDE RECEPTION

TECHNICAL FIELD

The present invention relates to a tire condition monitoring system for providing tire operation parameter information, such as tire inflation pressure, to a vehicle operator and for providing tire location identification regardless of previous tire position change due to tire position rotation or the like. The present invention relates specifically to a tire condition monitoring system that provides for positive communication control between a vehicle-based unit and tire sensor units to avoid lost communication and the like.

BACKGROUND OF THE INVENTION

Numerous tire condition monitoring systems have been developed in order to provide tire operation information to a vehicle operator. One example type of a tire condition monitoring system is a tire pressure monitoring system that detects when air pressure within a tire drops below a predetermined threshold pressure value.

There is an increasing need for the use of tire pressure monitoring systems due to the increasing use of "run-flat" tires for vehicles such as automobiles. A run-flat tire enables a vehicle to travel an extended distance after significant loss of air pressure within that tire. However, a vehicle operator may have difficulty recognizing the significant loss of air pressure within the tire because the loss of air pressure may cause little change in vehicle handling and little change in the visual appearance of the tire.

Typically, a tire pressure monitoring system includes a pressure sensing device, such as a pressure switch, an internal power source, and a communications link that provides the tire pressure information from a location at each tire to a central receiver unit. The central receiver unit is typically connected to an indicator or display located on a vehicle instrument panel.

The communications link between each tire-based unit and the central receiver unit is often a wireless link. In particular, radio frequency signals are utilized to transmit information from each of the tire-based units to the central receiver unit. However, in order for the central receiver unit to be able to properly associate/identify received tire pressure information with the tire associated with the transmission, some form of identification of the origin of the signal must be utilized. A need for identification of the origin of the transmitted tire information signal becomes especially important subsequent to a tire position change, such as tire position rotation during routine maintenance.

Along the lines of desiring uncorrupted and readily identified tire condition information, it is possible that the communications link between a tire-based unit and the central receiver may be disrupted. Such disruption may occur due to simultaneous communication from two tire-based units, multi-path interference from a single transmission, or rotating e-field created by tire movement.

Positive control of all of the communication that occurs within a system could have very desirable benefits, such as avoiding communication disruption or repeating disrupted communication. In particular, it may be desirable to have the positive control reside with the vehicle-based unit so that the vehicle-based unit may readily and reliably receive tire condition information. However, an ability of one unit to control another unit(s) is often thought of as being associated with the application and consumption of power (e.g., electrical power). In the marketplace of today, designs that incorporate high power consumption components are often rebuffed due to the cost of initial manufacture and/or the ongoing power use.

SUMMARY OF THE INVENTION

In accordance with one aspect, the present invention provides a tire condition sensor unit for association with a tire of a vehicle and for communicating a tire condition to a vehicle-based unit. Sensor means senses the tire condition. Transmitter means, operatively connected to the sensor means, transmits a condition signal that indicates the sensed tire condition. Receiver means, operatively connected to the sensor means and the transmitter means, receives a control signal and causes operation of the sensor means and the transmitter means during receipt of the control signal.

In accordance with another aspect, the present invention provides a tire condition sensor unit for association with a tire of a vehicle and for communicating a tire condition to a vehicle-based unit. Sensor means senses the tire condition. Transmitter means, operatively connected to the sensor means, transmits a condition signal that indicates the sensed tire condition. Receiver means, operatively connected to the sensor means and the transmitter means, receives a control signal and causes operation of the sensor means and the transmitter means during a predetermined time period.

In accordance with another aspect, the present invention provides a tire condition sensor unit for association with a tire of a vehicle and for communicating a tire condition to a vehicle-based unit. Sensor means senses the tire condition. Transmitter means, operatively connected to the sensor means, transmits a condition signal that indicates the sensed tire condition. Receiver means, operatively connected to the sensor means and the transmitter means, receives a control signal and causes operation of the sensor means and the transmitter means in response to receipt of the control signal. The receiver means includes means for amplifying strength of a received control signal.

In accordance with another aspect, the present invention provides a tire condition communication system for a vehicle. A tire condition sensing unit is operable to sense a tire condition and to transmit a signal indicative of the sensed condition. A vehicle-based unit receives the condition indicative signal. Communication means, which has a first portion associated with the vehicle-based unit and a second portion associated with the tire condition sensing unit, conveys a control signal from the vehicle-based unit to the tire condition sensing unit that causes the tire condition sensing unit to continue operation during conveyance of the control signal.

In accordance with another aspect, the present invention provides a method of communicating tire condition information from a tire condition sensor unit to a vehicle-based unit. A control signal is transmitted to a tire condition sensor unit. The control signal is received at the tire condition sensor unit. A condition is sensed at the tire. A signal indicative of the sensed condition is transmitted from the tire condition sensor unit so long as the control signal is received at the tire condition sensor unit.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF AN EXAMPLE EMBODIMENT

Figure 1:
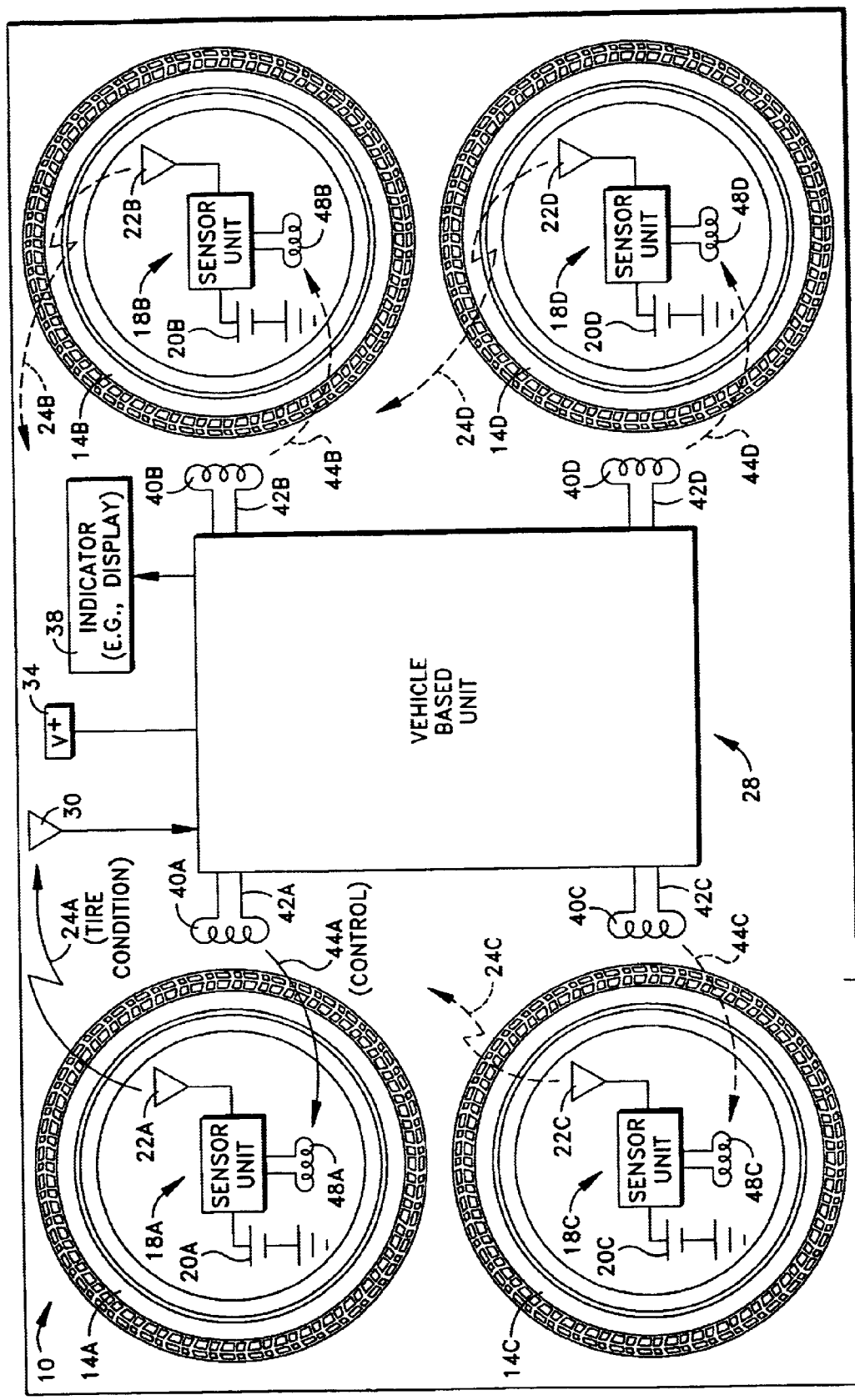
FIG. 1 is a schematic block diagram of a vehicle that contains a tire condition communication system with a plurality of tire condition sensor units in accordance with the present invention.

A tire condition communication system 10 is schematically shown within an associated vehicle 12 in FIG. 1. The vehicle 12 has a plurality of inflatable tires (e.g., 14A). In the illustrated example, the vehicle 12 has four tires 14A–14D. It is to be appreciated that the vehicle 12 may have a different number of tires. For example, the vehicle 12 may include a fifth tire (not shown) that is stored as a spare tire.

The system 10 includes a plurality of tire condition sensor units (e.g., 18A) for sensing one or more tire conditions at the vehicle tires (e.g., 14A). Generally, the number of tire condition sensor units 18A–18D is equal to the number of tires 14A–14D provided within the vehicle 12. In the illustrated example, all of the tire condition sensor units 18A–18D have the same components. Identical components are identified with identical reference numerals, with different alphabetic suffixes. It is to be appreciated that, except as noted, all of the tire condition sensor units 18A–18D generally function in the same manner. For brevity, operation of one of the tire condition sensor units (e.g., 18A) is discussed in detail, with the understanding that the discussion is generally applicable to the other tire condition sensor units (e.g., 18B–18D).

Each tire condition sensor unit (e.g., 18A) includes a power supply (e.g., a battery 20A) that provides electrical energy to various components within the respective sensor unit. The electrical energy enables the tire condition sensor unit (e.g., 18A) to energize a radio frequency antenna (e.g., 22A) to emit a radio frequency signal (e.g., 24A) that is indicative of one or more sensed conditions along with an identification to a central, vehicle-based unit 28. Specifically, a radio frequency antenna 30 receives the condition indicative signal (e.g., 24A) from the tire condition sensor unit (e.g., 18A) and the conveyed information is processed. In one example, the system 10 is designed to operate with the condition signals (e.g., 24A) in the FM portion of the radio frequency range. Thus, each sensor unit antenna (e.g., 22A) in conjunction with the vehicle-based unit antenna 30 comprises part of a means for communication from the respective tire condition sensor unit (e.g., 18A) to the vehicle-based unit 28.

A power supply (e.g., a vehicle battery) 34, which is operatively connected to the vehicle-based unit 28, provides electrical energy to permit performance of the processing and the like. The vehicle-based unit 28 utilizes the processed information to provide information to a vehicle operator (not shown) via an indicator device 38. In one example, the indicator device 38 may be a visual display that is located on an instrument panel of the vehicle 12. Accordingly, the vehicle operator is apprised of the sensed condition(s) at the tire (e.g., 14A).

It is to be noted that the sensed condition may be any condition at the tire (e.g., 14A). For example, the sensed condition may be inflation pressure of the tire (e.g., 14A), temperature of the tire, motion of the tire, or even a diagnostic condition of the tire condition sensor unit (e.g., 18A) itself.

Preferably, only a single antenna 30 of the vehicle-based unit 28 receives all of the condition signals 24A–24D from the plurality of tire condition sensor units 18A–18D. In order for the vehicle-based unit 28 to accurately "know" which tire condition sensor unit (e.g., 18A) is providing the condition signal (e.g., 24), each signal conveys an identification. The vehicle-based unit 28 has been taught or has learned to recognize the identifications of the tires 14A–14D associated with the vehicle 12 within which the system 10 is provided.

Typically, the tire condition sensor unit (e.g., 18A) operates (i.e., senses the condition(s) and transmits the condition signal) on a preset/prearranged time schedule. However, the condition signal 24A (i.e., the communication from the tire condition sensor unit) may be interrupted thus leaving the vehicle-based unit 28 without current tire condition information.

In order for the vehicle-based unit 28 to obtain current tire condition information or otherwise obtain performance from the tire condition sensor units 18A–18D, the vehicle-based unit has an ability to control operation of the tire condition sensor units and thus control the communication from the tire condition sensor units. The system 10 includes a plurality of antennas 40A–40D that are operatively connected 42A–42D to the vehicle-based unit 28. Each antenna (e.g., 40A) is controlled to be energized by the vehicle-based unit 28 to output a control signal (e.g., 44A) that causes an associated one (e.g., 18A) of the tire condition sensor units to perform its function. Specifically, the respective tire condition sensor unit (e.g., 18A) operates to sense the certain condition(s) and transmit its condition signal (e.g., 24A) in response to the control signal (e.g., 44C). Moreover, the system 10 is configured such that so long as the control signal (e.g., 44A) is provided, the respective tire condition sensor unit (e.g., 18A) continues to operate.

In the illustrated embodiment, the transmission of a control signal (e.g., 44A) is during, i.e., in response to, reception of a condition signal (e.g., 24A) at the vehicle-based unit 28. For example, during a routine transmission of a condition signal (e.g., 24A) that is output in accordance with the prearranged time schedule of a tire condition sensor unit (e.g., 18A), the associated control signal (e.g., 44A) is output by the vehicle-based unit 28. Thus, the tire condition sensor unit (e.g., 18A) continues to operate. Accordingly, the vehicle-based unit 28 has taken control of the tire condition sensor unit (e.g., 18A).

It is to be appreciated that the output of the control signal (e.g., 44A) and thus the control of the tire condition sensor unit (e.g., 18A) by the vehicle-based unit 28 is selective. In other words, the vehicle-based unit 28 makes a determination as to whether the tire condition sensor unit (e.g., 18A) is to be controlled to continue to operate.

In the illustrated embodiment, each control signal (e.g., 44A) is a low frequency signal that is provided in the form of a magnetic field or magnetic induction signal. The frequency of the control signals (44A–44D) is much lower that the frequency of the condition signals (24A–24D) that convey the tire condition information to the vehicle-based unit 28. In one example, the frequencies of the control signals 44A–44D are each at or near 125 kHz. Accordingly, in the illustrated embodiment, the antennas 40A–40D are magnetic field induction coils. Hereinafter, the antennas 40A–40D are referred to as low frequency antennas.

However, it is contemplated that other frequencies (e.g., 13 MHz) above or below the above-mentioned frequency may be utilized.

Each low frequency antenna (e.g., 40A) is mounted on the vehicle 12 at a location adjacent to a respective one (e.g., 14A) of the vehicle tires. In one example, each low frequency antenna (e.g., 40A) is mounted within the wheel well associated with the respective tire (e.g., 14A). Signal strength of each low frequency control signal (e.g., 44A) drops considerably as the distance from the outputting low frequency antenna (e.g., 40A) increases. Specifically, magnetic field signal strength decreases as a function of the inverse of the cube of the distance ($1/D^3$) from the antenna. Accordingly, the low frequency control signals 44A–44D are output at a strength to only permeate the space within the associated wheel well, about the associated tire. The low frequency control signals 44A–44D are preferably not output at a strength to noticeably permeate the space about any of the other tires (e.g., 14B–14D).

Each tire condition sensor unit (e.g., 18A) includes a low frequency reception antenna (e.g., 48A) for receiving the control signal (e.g., 44A) that is output from the low frequency antenna (e.g., 40A) located adjacent to the respective tire (e.g., 14A) to which the tire condition sensor unit is associated. In the illustrated example, the low frequency reception antennas 48A–48D are magnetic induction coils. Each associated pair of low frequency antennas (e.g., 40A and 48A) comprise part of a means for communication from the vehicle-based unit 28 to the respective tire condition sensor unit (e.g., 18A).

It is to be noted that in one example, the communication from the vehicle-based unit 28 to the respective tire condition sensor unit (e.g., 18A) is a control stimulus only and does not convey information, such as identification information. It is contemplated that information could be conveyed. The pairing of low frequency antennas (e.g., 40A and 48A) as a means for communication from the vehicle-based unit 28 to the respective tire condition sensor unit (e.g., 18A) provides sufficient ability to select and control the associated tire condition sensor unit.

It is contemplated that communication from the tire condition sensor units 18A–18D to the vehicle-based unit 28 may be corrupted, disrupted, or the like. The ability, in accordance with the present invention, of the vehicle-based unit 28 to control a tire condition sensor unit (e.g., 18A) to operate via provision of the associated control signal (e.g., 44A) provides a clear means to ensure that the desired communication from the selected tire condition sensor unit is accomplished.

Further, the system 10 lends itself to ease of testing the operability of the tire condition sensor units 18A–18D. Specifically, output of a control signal (e.g., 44C) to an associated tire condition sensor unit (e.g., 18A) should cause continuing operation of the tire condition sensor unit, and thus should cause provision of the tire condition signal (e.g., 24A). The control signal (e.g., 44A) may be provided for any length of time to ensure sufficient opportunity for the tire condition sensor unit (e.g., 18A) to respond with its communication. If the vehicle-based unit 28, despite provision of the control signal (e.g., 44A) does not receive the tire condition signal (e.g., 24A), the vehicle-based unit interprets the lack of the communication from the tire condition sensor unit (e.g., 18A) as an indication that the sensor unit is faulty (e.g., dying battery).

Figure 2:
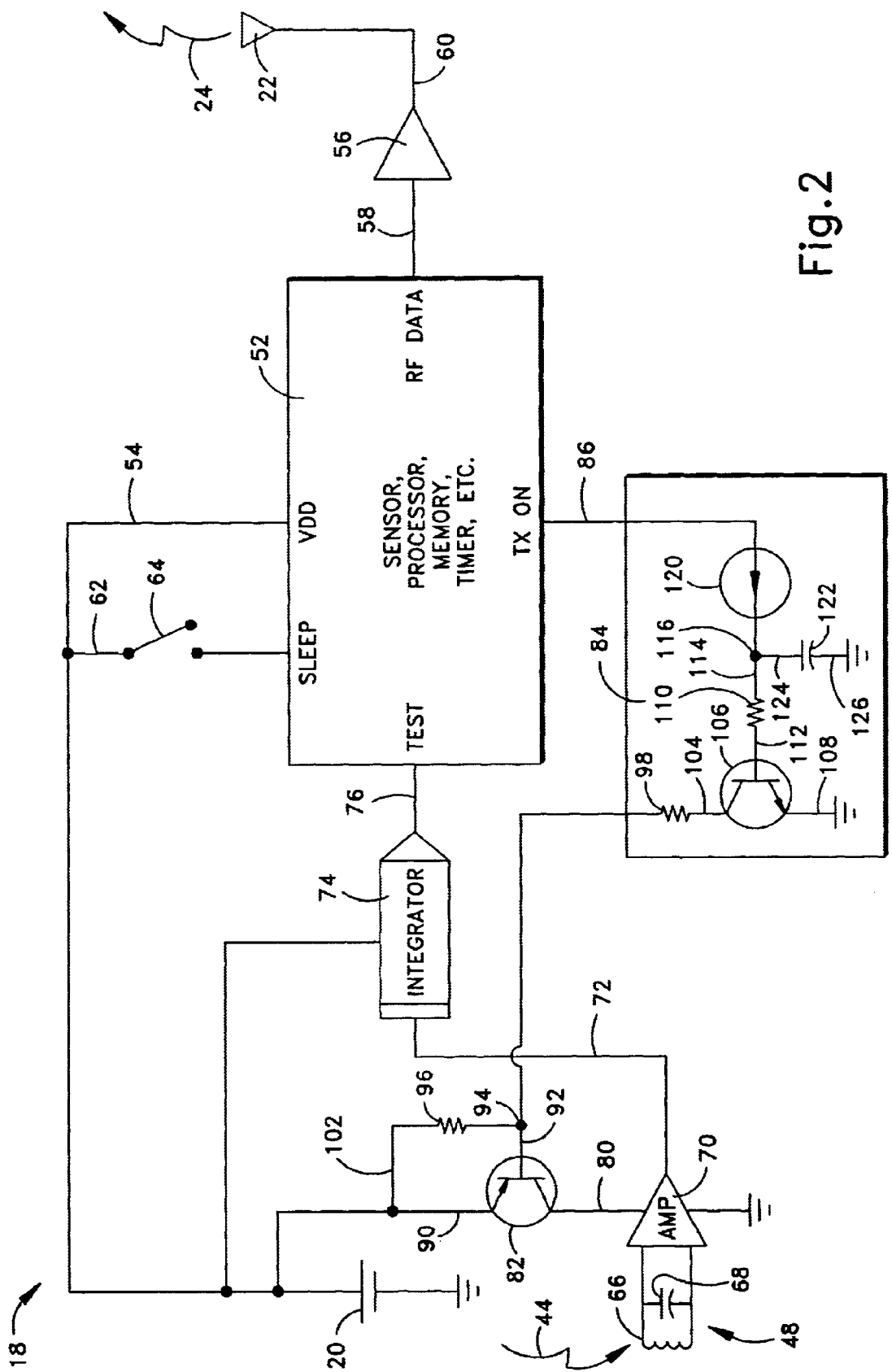
FIG. 2 is a function block diagram for one of the tire condition sensor units shown in FIG. 1.

FIG. 2 schematically illustrates one example of a tire condition sensor unit 18 (generically shown without alphabetic suffixes on the reference numerals). An application specific integrated circuit (ASIC) 52 is operatively connected 54 to the battery 20, via input $V_{DD}$. The ASIC 52 includes various circuitries. In particular, the ASIC 52 includes circuits that provide one or more sensor devices (e.g., an inflation pressure sensor). The ASIC 52 also includes circuits that store an identification in a memory, assemble a message containing sensory information and the identification, and output the message as an electrical data signal. The ASIC 52 also includes a circuit that provides a timer.

An amplifier 56 is operatively connected 58 to a data output of the ASIC 52 and is also operatively connected 60 to the antenna 22. In response to an electrical data signal from the ASIC 52, the amplifier 56 stimulates the antenna 22 such that the tire condition signal 24 is output. The timer circuit within the ASIC 52 controls the sensing and signal output in accordance with a prearranged/preprogrammed time schedule.

It should be noted that the in the illustrated example, the ASIC 52 has an input (identified as a sleep input) operatively connected 62 to the battery 20 through a centrifugal switch 64. When the associated tire is not in motion (e.g., the vehicle is parked) the ASIC 52 is in a sleep mode. Within the sleep mode, various functions are suspended (e.g., sensory information is not derived). Thus, the sleep mode helps conserve battery power.

The low frequency reception antenna 48 includes an induction coil 66 and a capacitor 68 that are connected in parallel. The received control signal 44 is transformed into an electrical signal. The parallel connected coil 66 and capacitor 68 are connected across the inputs of an amplifier 70, which amplifies (e.g., amplitude) the electrical signal representing the received control signal.

An output of the amplifier 70 is connected 72 to an integrator 74, which is in turn connected 76 to an input (identified as test input) of the ASIC 52. In response to a signal from the integrator 74 indicating reception of the control signal 44, the ASIC 52 is controlled to operate (e.g., sense the condition(s) and output the data signal to the amplifier 56).

The amplifier 70 is connected 80 to receive electrical energy from the battery 20 via a switch 82. In the illustrated example, the switch 82 is a transistor. A timer circuit 84 controls the switch 82. The timer circuit 84 is constructed and connected 86 to an output (identified as TX ON) of the ASIC 52 such that the timer circuit is energized to operate when the data signal is output to the amplifier 56 to cause condition signal transmission. Once the data signal ceases, the timer circuit 84 times-out a predetermined time duration. Thus, the powering of the amplifier 70 is via a duty cycle.

During energization and time-out of the timer circuit 84, the switch 82 is ON such that the amplifier 70 is powered. Thus, during sending of the condition signal 24 and for a predetermined time period after the condition signal is sent, the control signal 44 can be received. Also, because the receipt of the control signal 44 causes continued transmission of the condition signal 24, the amplifier 70 is continuously energized to continue to receive the control signal. In otherwolds, the reception of the control signal 44 and transmission of the condition signal 24 continues until the vehicle-based unit 28 (FIG. 1) ceases transmission of the control signal. Thus, the system 10 has the feature of closed loop control of the communication from the tire condition sensor units 18A–18D, with the vehicle-based unit 28 possessing the ability to control the communication.

The timer circuit 84 and the switch 82 are thus considered an arrangement for providing power to the amplifier. It is to be realized the power providing arrangement may have any suitable construction/configuration to accomplish the task of providing power to the amplifier in a decided manner (e.g., during, and continuing after, the condition signal transmission). In the example of FIG. 2, the switch 82 is a PNP type transistor, with the emitter connected 90 to the battery 20 and the collector connected 80 to the power input of the amplifier 70. The base of the PNP transistor is connected 92 to a node 94 between two serially connected resistors 96 and 98. The first resistor 96 has an end that is connected 102 to the battery 20, and the second resistor 98 has an end that is connected 104 to the collector of a NPN transistor 106. The emitter of the NPN transistor 106 is connected 108 to electrical ground. A resistor 110 is connected to the base of the NPN transistor 106. The other end of the resistor 110 is connected 114 to a node 116. Connected to the node 116 is an input from the ASIC that provides a current source 120. A capacitor 122 is connected 124 to the node 116 and is connected 126 to electrical ground. While the ASIC 52 provides current, and before the capacitor 122 discharges after cessation of the current from the ASIC, the NPN transistor 106 and PNP transistor 82 are ON and power is provided to the amplifier 70.

It is to be understood that the use of the amplifier 70 that has a controlled power supply can concurrently permit the use of smaller components (e.g., the antenna 48 and the antenna 40, see FIG. 1), and can thus permit reduced power consumption. Also, the duty-cycling of the provision of power to the amplifier 70 also permits reduced power consumption.

Figure 3:
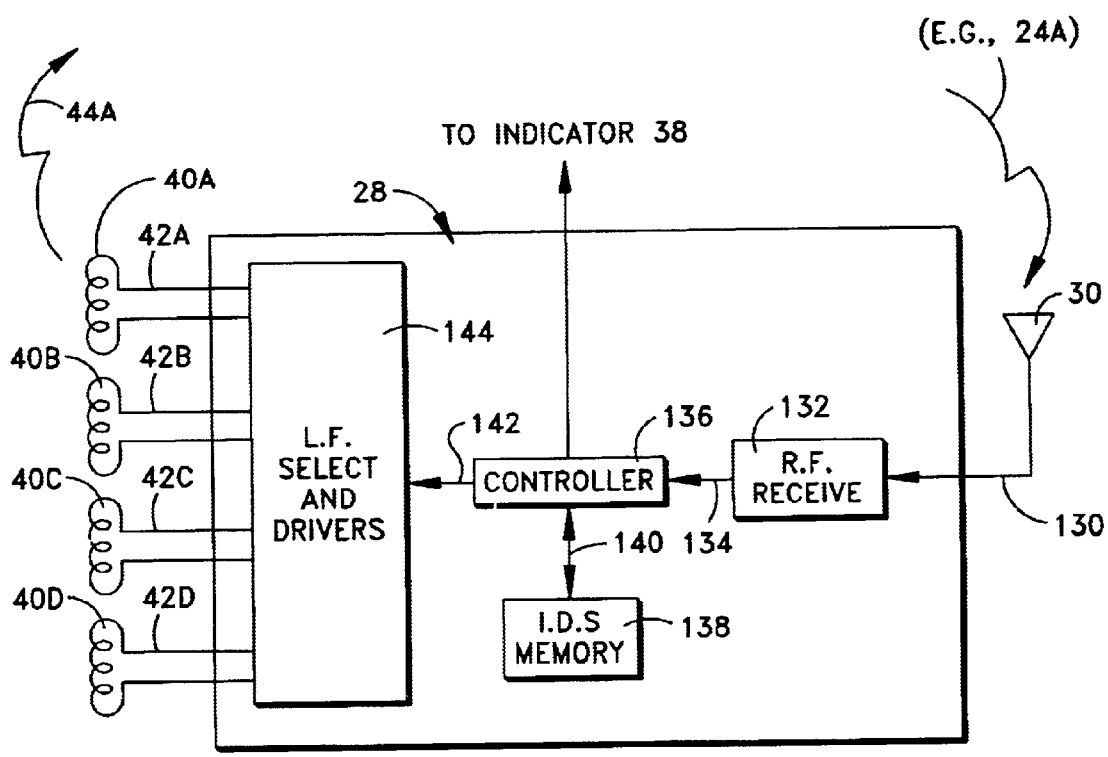
FIG. 3 is a function block diagram of a central, vehicle-based unit shown in FIG. 1.

FIG. 3 schematically illustrates one example of the vehicle-based unit 28. The antenna 30 is operatively connected 130 to radio frequency receive circuitry 132 at the vehicle-based unit 28. The reception of the condition signal (e.g., 24A) results in the provision of an electrical stimulation signal to the radio frequency receive circuitry 132. In turn, the radio frequency receive circuitry 132 is operatively connected 134 to a controller 136 such that the contents of the received condition signal (e.g., 24A) are conveyed to the controller.

The controller 136 processes the received information from the condition signal. In particular, the controller 136 compares the signal-conveyed identification to an identification provided from an identifications memory 138 that is operatively connected 140 to the controller 136. If the identification (i.e., from a tire condition sensor unit located at a tire on the vehicle) is a valid identification, the controller 136 further processes the information conveyed via the signal and provides an appropriate signal to the indicator device 38. For example, if the sensed condition is inflation pressure, the controller 136 provides control signals such that the indicator device 38 provides an indication of the sensed pressure.

The controller 136 of the vehicle-based unit 28 is also operatively connected 142 to a low frequency selection and driver component 144. The low frequency selection and driver component 144 is operatively connected 42A–42D to the plurality of low frequency antennas 40A–40D.

The controller 136 monitors one or more factors or parameters (e.g., reception of condition signals) that are used to determine whether to send a control signal (e.g., 44A) to a tire condition sensor unit (e.g., 18A, FIG. 1) and take control of the operation of that tire condition sensor unit. Upon a determination to send a control signal (e.g., 44A), the controller 136 provides a signal to the low frequency selection and driver component 144 to cause a stimulus signal to be provided to one of the low frequency antennas (e.g., 40A).

As mentioned, the present invention permits the vehicle-based unit 28 to control the communication. The control provided by the vehicle-based unit 28 permits correction of errors that may occur, such as by signal collisions, merely by causing repeat signal transmissions. If interference of a signal does occur, communication can immediately be re-initialized.

From the above description of the invention, those skilled in the art will perceive improvements, changes and modifications. For example, although it is preferred that the low frequency antennas are used for conveyance of the control signal, it is contemplated that the control signal may be conveyed via different structure. Also, the control signal may convey information to the associated tire condition sensor unit. Such improvements, changes and modifications within the skill of the art are intended to be covered by the appended claims.

Having described the invention, the following is claimed:

1. A tire condition sensor unit for association with a tire of a vehicle and for communicating a tire condition to a vehicle-based unit, said tire condition sensor unit comprising:
   sensor means for sensing the tire condition;
   transmitter means, operatively connected to said sensor means, for transmitting a condition signal that indicates the sensed tire condition; and
   receiver means, operatively connected to said sensor means and said transmitter means, for receiving a control signal and for causing operation of said sensor means and said transmitter means during receipt of the control signal.

2. A tire condition sensor unit as set forth in claim 1, wherein said tire condition sensor unit and the vehicle-based unit are part of a tire condition communication system, and the vehicle-based unit comprises means for providing the control signal.

3. A tire condition sensor unit as set forth in claim 1, wherein said receiver means comprises an antenna for receiving the control signal and for outputting an electrical signal indicative of the received control signal, and an amplifier operatively connected to amplify the output signal from said antenna, said tire condition sensor unit comprises means for powering said amplifier during receipt of the control signal.

4. A tire condition sensor unit as set forth in claim 3, wherein said means for powering said amplifier comprises a switch connected between a power supply and said amplifier, and a control arrangement that controls said switch.

5. A tire condition sensor unit as set forth in claim 4, wherein said control arrangement controls said switch to provide power to said amplifier when said transmitter means transmits the condition signal.

6. A tire condition sensor unit as set forth in claim 5, wherein said sensor means is provided within an application specific integrated circuit that is operatively connected to said transmitter means and said control arrangement, said amplifier is connected to said application specific integrated circuit via an integrator.

7. A tire condition sensor unit as set forth in claim 4, wherein said control arrangement comprises components that provide a timer function that controls said switch to provide power to said amplifier during a timed period.

8. A tire condition sensor unit as set forth in claim 1, wherein said receiver means comprises a low frequency receiving antenna, and the control signal is a low frequency signal.

9. A tire condition sensor unit for association with a tire of a vehicle and for communicating a tire condition to a vehicle-based unit, said tire condition sensor unit comprising:

sensor means for sensing the tire condition;

transmitter means, operatively connected to said sensor means, for transmitting a condition signal that indicates the sensed tire condition; and receiver means, operatively connected to said sensor means and said transmitter means, for receiving a control signal and for causing operation of said sensor means and said transmitter means during a predetermined time period.

10. A tire condition sensor unit as set forth in claim 9, wherein said tire condition sensor unit and the vehicle-based unit are part of a tire condition communication system, and the vehicle-based unit comprises means for providing the control signal.

11. A tire condition sensor unit as set forth in claim 9, wherein said receiver means comprises an antenna for receiving the control signal and for outputting an electrical signal indicative of the received control signal, and an amplifier operatively connected to amplify the output signal from said antenna, said tire condition sensor unit comprises means for powering said amplifier during receipt of the control signal.

12. A tire condition sensor unit as set forth in claim 11, wherein said means for powering said amplifier comprises a switch connected between a power supply and said amplifier, and a control arrangement that controls said switch.

13. A tire condition sensor unit as set forth in claim 12, wherein said control arrangement controls said switch to provide power to said amplifier when said transmitter means transmits the condition signal.

14. A tire condition sensor unit as set forth in claim 13, wherein said sensor means is provided within an application specific integrated circuit that is operatively connected to said transmitter means and said control arrangement, said amplifier is connected to said application specific integrated circuit via an integrator.

15. A tire condition sensor unit as set forth in claim 9, wherein said receiver means comprises a low frequency receiving antenna, and the control signal is a low frequency signal.

16. A tire condition sensor unit for association with a tire of a vehicle and for communicating a tire condition to a vehicle-based unit, said tire condition sensor unit comprising:

sensor means for sensing the tire condition;

transmitter means, operatively connected to said sensor means, for transmitting a condition signal that indicates the sensed tire condition; and receiver means, operatively connected to said sensor means and said transmitter means, for receiving a control signal and for causing operation of said sensor means and said transmitter means in response to receipt of the control signal, said receiver means including means for amplifying strength of a received control signal.

17. A tire condition sensor unit as set forth in claim 16, wherein said tire condition sensor unit and the vehicle-based unit are part of a tire condition communication system, and the vehicle-based unit comprises means for providing the control signal.

18. A tire condition sensor unit as set forth in claim 16, wherein said receiver means comprises an antenna for receiving the control signal and for outputting an electrical signal indicative of the received control signal, said means for amplifying comprises an amplifier that is operatively connected to amplify the output signal from said antenna, said tire condition sensor unit comprises means for powering said amplifier during receipt of the control signal.

19. A tire condition sensor unit as set forth in claim 18, wherein said means for powering said amplifier comprises a switch connected between a power supply and said amplifier, and a control arrangement that controls said switch.

20. A tire condition sensor unit as set forth in claim 19, wherein said control arrangement controls said switch to provide power to said amplifier when said transmitter means transmits the condition signal.

21. A tire condition sensor unit as set forth in claim 20, wherein said sensor means is provided within an application specific integrated circuit that is operatively connected to said transmitter means and said control arrangement, said amplifier is connected to said application specific integrated circuit via an integrator.

22. A tire condition sensor unit as set forth in claim 19, wherein said control arrangement comprises components that provide a timer function that controls said switch to provide power to said amplifier during a timed period.

23. A tire condition communication system for a vehicle, said system comprising:

a tire condition sensing unit operable to sense a tire condition and to transmit a signal indicative of the sensed condition;

a vehicle-based unit for receiving the condition indicative signal; and communication means, having a first portion associated with said vehicle-based unit and a second portion associated with said condition sensing unit, for conveying a control signal from said vehicle-based unit to said tire condition sensing unit that causes said tire condition sensing unit to continue operation during conveyance of the control signal.

24. A tire condition communication system as set claim 23, wherein said second portion of said communication means comprises an antenna for receiving the control signal and for outputting an electrical signal indicative of the received control signal, and an amplifier that is operatively connected to amplify the output signal from said antenna, said tire condition sensor unit comprises means for powering said amplifier during receipt of the control signal.

25. A tire condition communication system as set forth in claim 24, wherein said means for powering said amplifier comprises a switch connected between a power supply and said amplifier, and a control arrangement that controls said switch.

26. A tire condition communication system as set forth in claim 25, wherein said control arrangement controls said switch to provide power to said amplifier when said tire condition sensing unit transmits the condition signal.

27. A method of communicating tire condition information from a tire condition sensor unit to a vehicle-based unit, said method comprising:

transmitting a control signal to a tire condition sensor unit;

receiving the control signal at the tire condition sensor unit;

sensing a condition at the tire; and transmitting a signal indicative of the sensed condition from the tire condition sensor unit so long as the control signal is received at the tire condition sensor unit.

* * * * *